Figure 1:
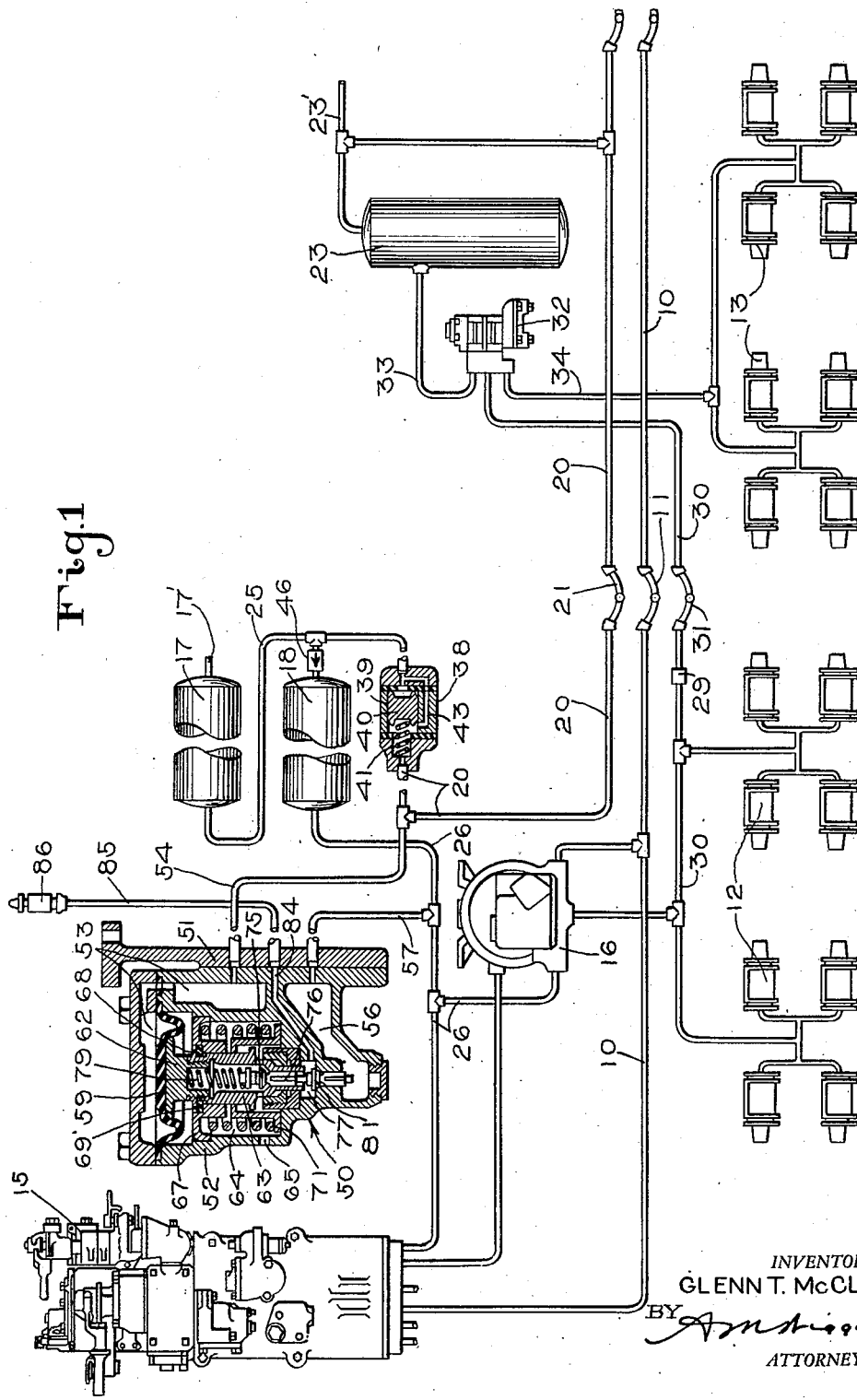

June 26, 1945.　　　G. T. McCLURE　　　2,379,308
FLUID PRESSURE BRAKE APPARATUS
Filed Jan. 29, 1944　　　2 Sheets-Sheet 2

INVENTOR
GLENN T. McCLURE
BY
ATTORNEY

Patented June 26, 1945

2,379,308

UNITED STATES PATENT OFFICE 2,379,308

FLUID PRESSURE BRAKE APPARATUS

Glenn T. McClure, McKeesport, Pa., assignor to The Westinghouse Air Brake Company, Wilmerding, Pa., a corporation of Pennsylvania Application January 29, 1944, Serial No. 520,267

5 Claims. (Cl. 303—85)

This invention relates to fluid pressure brakes, and more particularly to an air brake equipment of the type employed on a railway locomotive.

Diesel-powered locomotives for certain classes of railway service in some instances comprise a plurality of individual power units permanently coupled together. For example, a complete Diesel locomotive may consist of one A unit permanently coupled to first and second B units, all three power units carrying engine equipments controlled from the A unit. Diesel locomotives of this class are operative to exert great tractive effort, particularly at low speeds. Although such Diesel locomotives are regularly operated to great advantage and without undue risk of separation of the several units, actual experience has demonstrated that such an accident is possible, and that the leading portion of a Diesel locomotive might break away from the other units and the rest of the train. The engineer stationed in the leading portion may in fact be unaware that a break-in-two has occurred, by reason of the enormous power which that unit delivers, and as a result, the parting of the main reservoir pipe between the separated units of the locomotive may seriously impair his control of the brake equipment. The locomotive brake equipment on a multiple unit Diesel locomotive is, of course, designed to operate automatically upon parting of the brake pipe to effect an emergency application of the brakes, but if the engineer is unaware of a break-in-two and consequently allows his brake valve to remain in running position, and if, as is usually the case, the controlled emergency feature of the equipment has been set for freight service to permit only a slow rate of brake cylinder pressure development, the loss of main reservoir pressure through the broken main reservoir pipe will in a short time seriously limit the brake cylinder pressure obtainable on the leading portion of the locomotive.

It is an object of my invention to provide an improved locomotive brake equipment designed for Diesel units of the above identified class, including means operative to prevent brake failures of this nature.

Another object of the invention is to provide improved protective mechanism operative to prevent complete loss of main reservoir pressure in case of a train break-in-two.

Still another object is to provide means operative when a main reservoir pipe on a locomotive is broken to prevent loss of main reservoir pressure, which means may readily be installed in an existing brake equipment for cooperation with standard brake controlling devices without impairing the normal functioning of the apparatus.

Figure 2:
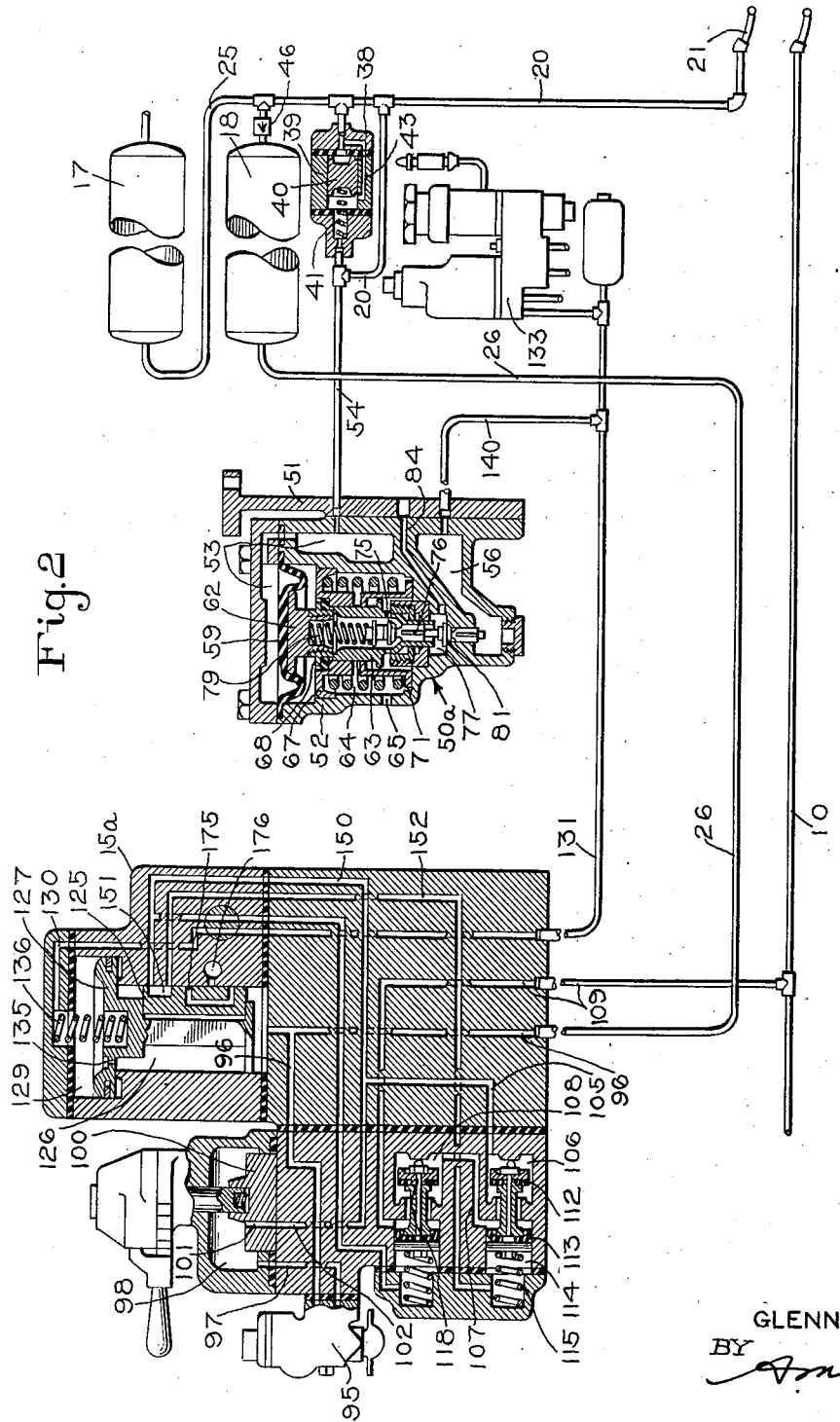

Other objects and advantages of the invention will appear in the following more detailed description thereof, taken in connection with the accompanying drawings, in which Fig. 1 is a diagrammatic view of a portion of a modern air brake equipment for a multiple unit Diesel locomotive embodying one form of the invention, such portions of the brake equipment as do not concern the invention having been omitted; and Fig. 2 is a diagrammatic view, partly in section, of a portion of the air brake equipment carried by a leading unit of a Diesel locomotive, and embodying the invention in a different form.

Apparatus shown in Fig. 1

Illustrated in Fig. 1 of the drawings, mainly in diagrammatic form, are the portions of an air brake equipment for a multiple unit locomotive that are of interest in connection with the disclosure of one form of the invention. The equipment shown in Fig. 1 includes a brake pipe 10, shown in two sections for separate units of the locomotive and connected by coupling means 11, a plurality of brake cylinders 12 carried on the leading locomotive unit, and a similar group of brake cylinders 13 adapted to be mounted on the trailing unit. The equipment further includes an engineer's brake valve device 15, a distributing valve device 16, and a pair of main reservoirs 17 and 18, all carried on the leading locomotive unit for controlling the brake cylinders on both units. As hereinafter explained, the main reservoirs 17 and 18 are connected to a main reservoir pipe 20, the separate sections of which are connected by coupling means 21, the section of the pipe carried on the trailing locomotive unit being connected to a separate main reservoir 23 carried on that unit. It will be understood that the main reservoirs 17 and 18 are adapted to be charged with fluid under pressure delivered through a pipe 17' by means of a compressor (not shown) mounted on the loading locomotive unit, and that the main reservoir 23 is likewise adapted to be charged with fluid under pressure through the medium of another compressor equipment (not shown), carried on the trailing locomotive unit, the flow of fluid to the reservoir being by way of a pipe 23'.

The brake valve device 15 may be of a standard design comprising a rotary valve portion manually operative for controlling simultaneous operation of the train brakes and locomotive brakes, and an independent brake valve portion manually operable to control the independent air brakes on the leading unit of the locomotive. The distributing valve device 16 likewise may be of a standard design constructed and arranged for cooperation with the brake valve device to control an automatic application of the brakes on the locomotive unit in conjunction with an application of the brakes throughout the train. The distributing valve device 16 will also be understood to respond to operation of the independent brake valve portion of the brake valve device 15 to effect an application of the locomotive brakes independently of the brakes in the train. These elements of the locomotive brake equipment, and their functions, are well understood by those versed in the operation of railway apparatus, and need not be further described.

In Fig. 1, both the main reservoirs 17 and 18 are shown as connected through the medium of a pipe 25 to the main reservoir pipe 20 communicating with the other main reservoir 23 on the trailing unit of the locomotive. A check valve 46 is provided for preventing back flow to pipe 25 from the main reservoir 18, which is also connected to pipe 26 communicating with the brake valve device 15, and with a suitable pipe fitting in the distributing valve device 16. The distributing valve device 16 is operative in the usual manner to supply compressed air directly to the brake cylinders 12 on the leading locomotive unit by way of a brake cylinder pipe 30. This pipe is extended through the trailing unit of the locomotive through the medium of coupling means 31, and is connected to a relay valve device 32 mounted on that unit. A choke fitting 29 is interposed in pipe 30 forward of the coupling means 31. The relay valve device 32 may be of any suitable construction, and is operative upon an increase in the pressure of air supplied to the pipe 30 to supply air at like pressure from the main reservoir 23 through a pipe 33 to a brake cylinder pipe 34 connected to the several brake cylinder devices 13 mounted on the trailing unit of the locomotive.

According to the invention, a cut-off valve device 38 is interposed in the pipe 25 connecting the main reservoirs 17 and 18 to the main reservoir pipe 20. The cut-off valve device 38 comprises a casing having a valve cavity 39 formed therein and containing a slidably mounted valve 40, which is adapted to be urged by a spring 41 into a normal position, as shown, for maintaining open a restricted by-pass 43 which communicates at one side of the valve with the pipe 25 and at the other side with the main reservoir pipe 20. It will be apparent that upon an excessive reduction in the pressure of air in the main reservoir pipe 20, in the event of rupture of that pipe for example, the main reservoir pressure in the pipe 25 acting on the opposite side of the valve 40 will overcome the opposing pressure of the spring 41 and will shift the valve to close the restricted passage 43.

To provide means for producing an audible signal to warn the engineer in case of a break-in-two between units of the locomotive, the equipment is provided with a control valve device 50, which may comprise a pipe bracket 51 supporting a casing structure 52 having formed therein a diaphragm chamber 53 communicating by way of a pipe 54 with the pipe 20 and also having formed therein a supply chamber 56 communicating by way of a pipe 57 with pipe 26. Clamped within the casing structure is a flexible diaphragm 59 which is subject at its upper side to the pressure of air in diaphragm chamber 53. Engaging the lower surface of the diaphragm 59, as viewed in Fig. 1, is a follower member 62 to which is secured a hollow movable member 63, both members being contained within a chamber 64 formed in the casing and communicating with the atmosphere by way of a port 65. A piston element 67 is slidably mounted within the chamber 64 and is adapted to act against an annular collar 68, formed on the member 63, through the medium of a ring 69, which is interposed between the two members. A coil spring 71 is disposed in the chamber 64 and acts upwardly, as viewed in Fig. 1, against the piston element 67 for urging it, together with the movable member 63, follower member 62, and diaphragm 59, in opposition to the pressure of air in the diaphragm chamber 53.

The control valve device further comprises a valve element 75 contained within the hollow movable member 63 and has fluted stem 76 extending through a bore connecting the atmospheric chamber 64 to a valve chamber 77 formed in the casing structure. A coil spring 79 is interposed between the follower member 62 and the valve element 75 for urging the valve toward its seated position. Communication from the supply chamber 56 to the valve chamber 77 is controlled by another valve element 81, the upper surface of which is adapted for engagement by the fluted stem 76 of valve element 75 while the parts are in normal position, as shown in Fig. 1. In this position of the device, the valve element 81 is held in seated position. In the present embodiment of the invention, the valve chamber 77 communicates by way of a passage 84, formed in the casing structure with a pipe 85 provided with a whistle 86, which is adapted to operate for warning the engineer in the event of an accidental parting of the main reservoir pipe, as hereinafter explained.

Under normal conditions compressed air is supplied from the usual compressor (not shown) on the forward locomotive unit to the main reservoir 17 and by way of pipe 25 and check valve 46 to the main reservoir 18, from which the compressed air is supplied to the supply pipe 26 communicating with the brake valve device 15 and with the distributing valve device 16. Compressed air also flows from pipe 26 through pipe 57 to the chamber 56 of the control valve device 50. Main reservoir air in the pipe 25 is free to flow through the restricted by-pass 43 in cut-off valve device 38 to the main reservoir pipe 20, from which compressed air is supplied by way of a pipe 54 to the diaphragm chamber 53 in the control valve device 50. At the same time, compressed air is also supplied to the main reservoir 23 on the trailing unit of the locomotive, both by flow of air through the main reservoir pipe 20 and also by operation of auxiliary compressor means (not shown) mounted on that unit.

Main reservoir air thus supplied to the diaphragm chamber 53 of the control valve device 50 acts against the diaphragm 59 to force downwardly that element together with the follower members 62, movable member 63, and valve element 75, in opposition to the upward force of the spring 71. This downward force is applied to the valve element 75 through the medium of the spring 79, and by reason of engagement of the fluted stem 76 with the valve element 81 is effective to hold the latter valve element in seated position, as shown in Fig. 1.

If the coupled units of the locomotive should accidentally be separated, the brake control equipment carried on the forward unit becomes operative to limit any loss of main reservoir pressure while actuating the signal whistle 86 to warn the engineer of the accident. Upon failure of the flexible coupling means 21 attached to the main reservoir pipe 20, compressed air is at once vented from that pipe, and consequently from the chamber containing the spring 41 within the cut-off valve device 38, and also from the diaphragm chamber 53 in the control valve device 50. Upon the venting of compressed air from the main reservoir pipe 20 at a faster rate than that of flow through the restricted by-pass 43, the valve 40 is quickly shifted to the left, as viewed in Fig. 1, under the pressure of air in pipe 25, thereby closing the by-pass and preventing further loss of air from the main reservoir. At the same time, the reduction of pressure in the diaphragm chamber 53 of control valve device 50 renders the spring 71 effective to shift upwardly the piston element 67, movable member 63, follower member 62, and diaphragm 59. This movement of the movable member 63 causes seating of the valve element 75 and upward movement of the fluted stem 76 away from the valve element 81, which is then unseated to supply compressed air from the chamber 56 through the passage 84 and pipe 85 to the whistle device 86.

The engineer is thereby warned of the failure of the main reservoir pipe in time to take proper steps to bring the locomotive under control. Although the distributing valve device 16 has meanwhile become automatically operative, by reason of the venting of air from the broken brake pipe 10 when the locomotive units separated, to effect an automatic supply of air to the brake cylinder pipe 30 for operating brake cylinders 12, the engineer by prompt action can probably hasten the desired application of the brakes by movement of the brake valve device from running position to an application position, and by manipulation of the independent brake valve portion hereinbefore referred to. Unless the engineer is thus forwarned and enabled to operate the brake valve device as just explained, the build-up in brake cylinder pressure on the locomotive might be too slow under the circumstances, by reason of prior adjustment of the well known controlled emergency feature to effect the slow emergency build-up in brake cylinder pressure desirable for a long freight train.

It will be understood that the choke fitting 29 is designed to prevent loss of compressed air through the coupling means 31 of the brake cylinder pipe 30 at this time, the flow capacity of the choke fitting being considerably less than that of the supply communication through which compressed air is delivered to the brake cylinders 12 from the main reservoirs on the forward unit of the locomotive.

*Apparatus shown in Fig. 2*

In Fig. 2 of the drawings, the invention is illustrated in another form in association with certain standard automatic train control elements of the locomotive brake equipment. The equipment here includes cut-off valve means in the automatic brake valve device for closing the feed communication to the brake pipe in response to operation of a train control application valve, with which, means embodying my invention is adapted to cooperate in the event of accidental uncoupling of the forward unit of the locomotive from the other unit or units pulling the train. In this view, the automatic brake valve device, designated 15a, is shown diagrammatically and in incomplete form, only those elements thereof which are of interest in connection with the present invention being included. It will be understood that in actual practice, a complete locomotive brake equipment would comprise many other details of construction including not only such elements as are shown in Fig. 1, but also the devices such as are to be found, for example, in Patent 2,159,789 issued to Clyde C. Farmer on May 23, 1939, and in Patent 2,256,283, issued to Ellis E. Hewitt and Donald L. McNeal on September 16, 1941, both of which are assigned to the assignee of the present invention.

In the elementary illustration of the brake valve device 15a presented in Fig. 2, there is included a casing structure having mounted thereon a feed valve device 95, which is constructed and arranged to supply air at a predetermined pressure from the main reservoirs by way of the pipe 26, a passage 96, and a passage 97 to a rotary valve chamber 98 provided in the casing structure. Contained within the rotary valve chamber is a rotary valve 100 having a port 101 which registers with a passage 102 when the rotary valve is in running position, which as is commonly understood in railroad practice, is the normal operating position of the brake valve device when the brakes are released and the brake pipe pressure is being maintained. With the rotary valve in this position, air at the pressure determined by the feed valve setting is delivered to the brake pipe 10 by way of the passage 102 just mentioned, and thence through a passage 105, a valve chamber 106, a passage 107, a valve chamber 108, and a passage and pipe 109. Operatively mounted within the valve chamber 106 is a cut-off valve element 112 operative by a piston 113, which is interposed between the valve chamber and a piston chamber 114. A spring 115 is disposed within the piston chamber 114 for biasing the piston 113 and valve element 112 toward the normal position, as illustrated in the drawing, for maintaining communication between the passages 107 and 105. A similar cut-off valve element 118 is operatively mounted within the valve chamber 108, but inasmuch as this element is not involved in the present invention, its function need not be disclosed in detail.

The brake valve device 15a further includes an application valve portion of the train control type, which is constructed and arranged to respond to a reduction in fluid pressure for initiating an automatic application of the brakes while cutting off the supply of compressed air to the brake pipe. For a full description of the operation of this well known form of application valve device, commonly associated with a locomotive brake equipment, reference may be had to the aforementioned patents. In the elementary form in which the application valve device is shown in Fig. 2 of the drawings, there are included an application slide valve 125 operatively mounted within a valve chamber 126 communicating with the main reservoir supply passage 96, and an operating piston 127 connected to the slide valve and interposed between the valve chamber and a piston chamber 129, which is connected by way of a passage 130 and pipe 131 to a train control timing valve mechanism 133. The piston 127 is provided with a restricted feed port 135 connecting the valve chamber 126 to the piston chamber 129, and is normally urged downwardly toward the position in which the apparatus is shown in the drawings by a coil spring 136 disposed in the piston chamber.

The timing valve device 133 is illustrated in outline form in Fig. 2, since it embodies a well known construction that has been fully described and explained in other patents, including the two hereinbefore identified. It will be understood that the timing valve device 133 is an electro-pneumatic mechanism constructed and arranged to be controlled through the medium of a speed governor or similar train control device (not shown), for causing operation of the brake application valve device, comprising in this case the slide valve 125, when speed limits are exceeded, unless the engineer effects a manual brake application within a predetermined time interval.

In accordance with the invention, the equipment shown in Fig. 2 further includes a control valve device 50a, having the same features of construction already described in connection with the control valve device 50 shown in Fig. 1. In this form of the apparatus the chamber 56 of the control valve device 50a is connected by way of a pipe 140 with the pipe 131 leading to the brake valve device 15a, and the diaphragm chamber 53 communicates with the pipe 54 and main reservoir pipe 20, with which the cut-off valve device 38 is associated, in the same manner as disclosed in Fig. 1.

In operation, fluid under pressure is supplied from the main reservoirs 17 and 18 through the pipe 26 and passage 96 in the brake valve device to the application valve chamber 126, and thence by way of the restricted port 135 in the application piston 127 into the piston chamber 129, passage 130, pipe 131, pipe 140, and chamber 56 of the control valve device 50. Compressed air is also supplied from the passage 96 to the feed valve device 95, which is operative in the usual manner to supply air at a predetermined pressure through the passage 97 to the rotary valve chamber 98. With the rotary valve 100 disposed in running position, fluid under pressure is supplied through the port 101 therein, passage 102, a passage 150, a port 151 in the application slide valve 125, and a passage 152 leading to the piston chamber 114, the valve piston 113 and cut-off valve 112 being thereby held in the normal position with the valve unseated, as shown. Fluid under pressure is at the same time supplied by way of the passage 102 through passage 105, valve chamber 106, past the unseated cut-off valve 112, and through passage 107, valve chamber 108, and passage and pipe 109 to the brake pipe 10. It will be understood that the brake pipe is thus charged with fluid under pressure so that the brakes are maintained in released position.

Operation of the several elements of the brake system shown in Fig. 2 in effecting an application of the brakes need not be detailed here, but it will be understood that the brake equipment with which the invention is associated is designed to function in much the same manner as described in the patents hereinbefore identified.

In the event of a break-in-two between the forward unit of the locomotive, the equipment of which is shown in Fig. 2, and the trailing unit not shown in the drawings, so that the main reservoir pipe is vented through the coupling means 21, the cut-off valve device 38 becomes operative to prevent loss of air from the main reservoirs 17 and 18, as already described in connection with the same device shown in Fig. 1. At the same time, compressed air is vented from the diaphragm chamber 53 of the control valve device 50a by way of the broken main reservoir pipe coupling, and the spring 71 is thus rendered operative to free the valve element 81 for operation to permit discharge of compressed air from the chamber 56 to the atmospheric exhaust passage 84. Fluid under pressure is thereby discharged from the application piston chamber 129 in the brake valve device 15a by way of the passage 130, pipe 131, pipe 140, and the chamber 56, at a faster rate than that of flow permitted by the restricted port 135 in piston 127. Pressure of air supplied from the main reservoirs to the valve chamber 126 then raises the application piston 127 to move the application slide valve 125 upwardly.

When the pressure of air in the valve chamber 126 has thus moved the application piston 127 and application slide valve 125 upwardly to application position, in response to the reduction in pressure in piston chamber 129 as just explained, the cavity 151 is carried out of registration with the passage 152, and that passage is connected to the atmosphere by way of a cavity 175 formed in the slide valve and communicating with an exhaust port 176. Fluid under pressure is consequently vented from the piston chamber 114 at the outer face of the cut-off valve piston 113, with the result that air at feed valve pressure in the valve chamber 106 is rendered effective to shift the piston and cut-off valve element 112 secured thereto to closed position, against the force of the spring 116. It will thus be seen that the communication through which compressed air is normally supplied from the brake valve device to the brake pipe 10 is closed immediately following a break-in-two between units of the locomotive, regardless of possible inattention of the locomotive engineer at the time of the accident. An adequate supply of main reservoir air is thus insured for enabling proper control of the locomotive even after breakage of both the main reservoir pipe and the brake pipe.

From the foregoing it will be understood that a locomotive brake apparatus having the necessarily complex construction required for the proper control of a modern multi-unit locomotive may be provided with the safety features afforded by my invention without undue cost or alteration in any way of the operational characteristics of the air brake system.

Having now described my invention, what I claim as new and desire to secure by Letters Patent, is:

1. In an air brake equipment for a multi-unit locomotive, in combination, a main reservoir pipe extending through the units of the locomotive, a pair of main reservoirs mounted on the forward unit of said locomotive, a brake valve device, a supply pipe through which air under pressure is supplied from one of said main reservoirs to said brake valve device, a connecting pipe through which air under pressure is supplied from the other main reservoir to said first reservoir and to said main reservoir pipe, check valve means preventing back flow of air from said first main reservoir to said connecting pipe, cut-off valve means interposed between said connecting pipe and said main reservoir train pipe for closing communication thereto upon a sudden and excessive loss of air under pressure, and fluid pressure responsive indicating means operative by air from said supply pipe in response to such reduction in main reservoir pipe pressure.

2. In a brake equipment for a locomotive of the type having a plurality of power units coupled together, in combination, a main reservoir pipe extending through the units of the locomotive, a main reservoir communicating therewith, a brake pipe likewise extending through said units of the locomotive, brake valve means on the leading unit including a cut-off valve operative to control feed of air under pressure from said main reservoir to said brake pipe and a train control application valve operative upon a reduction in the pressure of air in a chamber to effect closure of said cut-off valve, a timing valve pipe communicating with said chamber, and a control valve device comprising valve means operable for venting said timing valve pipe and movable abutment means subject to the pressure of air in said main reservoir pipe for normally holding said valve means seated, said movable abutment means being operative to effect unseating of said valve means upon a sudden loss of pressure in said main reservoir pipe in the event of a break-in-two between units of said locomotive.

3. In a locomotive brake equipment, in combination, a main reservoir, a main reservoir train pipe communicating therewith, cut-off valve means controlling communication from said main reservoir to said main reservoir train pipe and operative to close said communication upon sudden loss of air from said pipe, a brake pipe, a feed valve operative to supply air under pressure from said main reservoir to said brake pipe, a brake valve device having a cut-off valve operative to close communication from said feed valve to said brake pipe and an application valve operable upon a reduction in the pressure of air in a chamber to effect closure of said cut-off valve, and control valve means subject to the pressure of air in said main reservoir train pipe, and automatically operative to vent air from said chamber in response to excessive loss of air under pressure from the last-named pipe.

4. In a fluid pressure brake equipment for a multi-unit locomotive, in combination, a brake pipe, a main reservoir, a main reservoir train pipe communicating therewith and extending through all units of said locomotive, a brake valve device on the leading unit having a running position in which fluid under pressure is normally fed from said main reservoir to said brake pipe and a cut-off valve operable to stop such feed, a train control application valve device responsive to a reduction of fluid pressure to actuate said cut-off valve while initiating a train control application of the brakes regardless of the fact that said brake valve device may remain in said running position, a timing valve device automatically operative to reduce the pressure of fluid acting on said application valve device, and a control valve device also operable to reduce the pressure of fluid acting on said application valve device in response to an excessive loss of fluid under pressure from said reservoir train pipe due to accidental parting of units of said locomotive.

5. In a fluid pressure brake system for a locomotive having a plurality of power units, in combination, a pair of connected main reservoirs mounted on the leading locomotive unit, a main reservoir train pipe extending through all units of said locomotive and adapted to be supplied with fluid under pressure from one of said main reservoirs, fluid pressure brake means including a brake valve device and brake pipe adapted to be supplied with fluid under pressure from the other main reservoir, and a protection valve device interposed in said main reservoir train pipe on said leading locomotive unit for preventing accidental loss of main reservoir pressure in the event of a break-in-two between units of the locomotive, said protection valve device comprising a casing having a restricted by-pass, a spring, and a check valve normally positioned by said spring for maintaining said by-pass open and operative upon a sudden reduction in pressure of fluid in said main reservoir train pipe for closing said by-pass.

GLENN T. McCLURE.